Patented Jan. 2, 1934

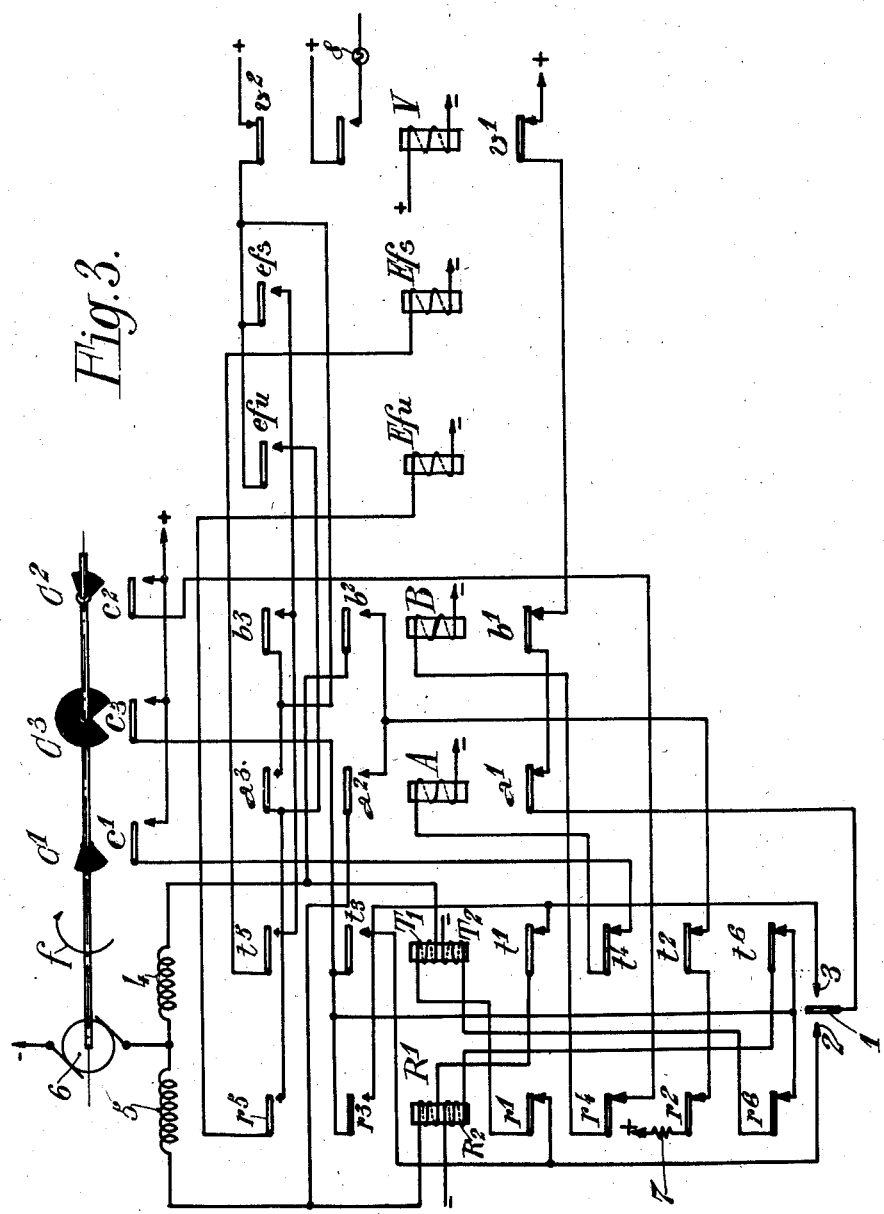

1,941,955

UNITED STATES PATENT OFFICE 1,941,955

REMOTE TRANSMISSION AND CONTROL DEVICE

Léon Adolphe Bernard Rondot, Jeanne-Rose, Montchanin, France

Application November 21, 1932, Serial No. 643,776, and in France November 23, 1931

6 Claims. (Cl. 172—239)

This invention relates to a remote transmission and control device through impulses sent by wires, without wire or by directional waves, and by means of which any suitable members placed at a receiving station are automatically controlled from an emitting station according to the indications supplied for instance by a measuring or like apparatus placed at the said emitting station.

The invention will be more clearly understood from the following description given, by way of example only, with reference to the accompanying drawings in which:

Fig. 3 is a diagrammatic view of a modification of Fig. 1.

Figure 1:
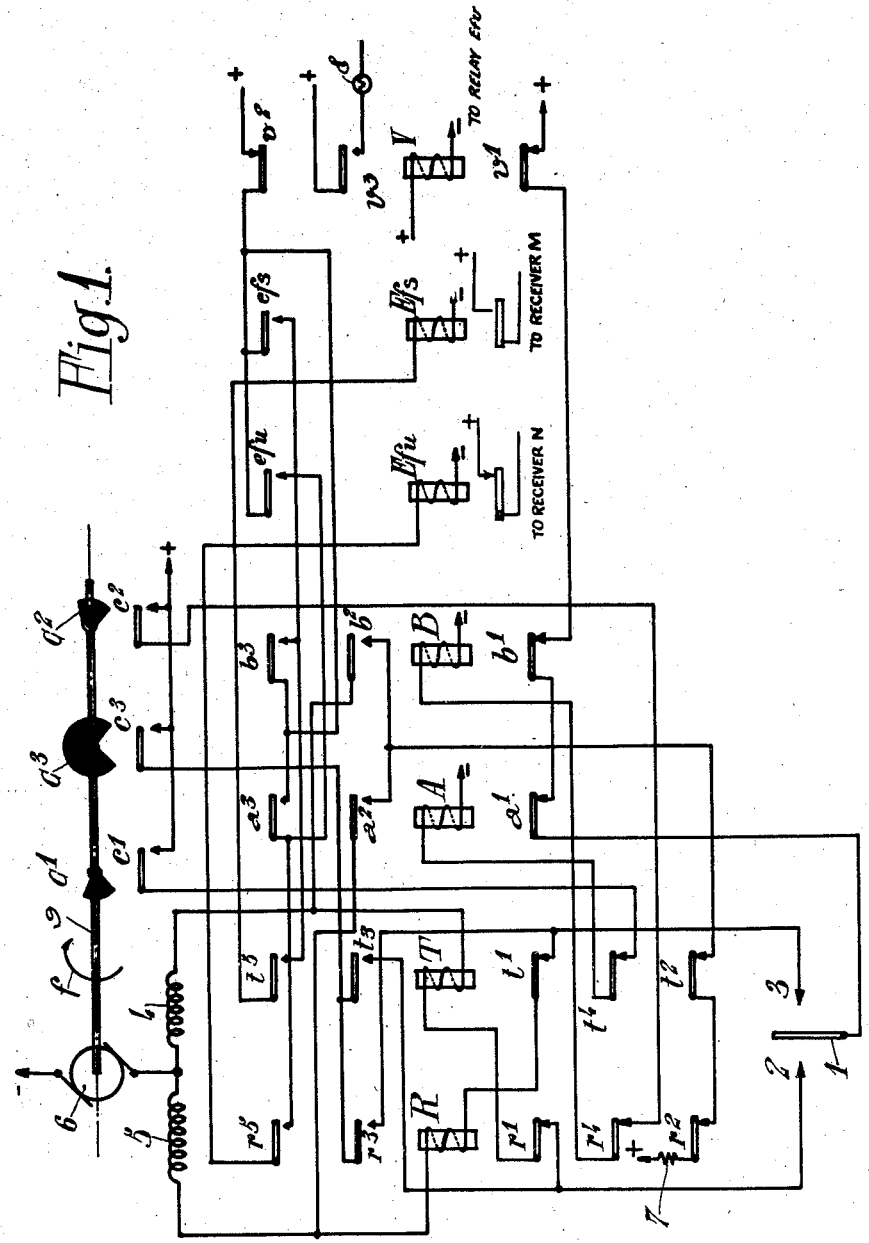
Fig. 1 is a diagrammatic view of a form of construction of an emitting station according to the invention.

The emitting station, illustrated in Fig. 1, comprises an auxiliary engine 6 having two windings 4 and 5 so arranged that the directions of rotation of the motor are reverse to each other according as the current passes through one or the other of these windings. The shaft 9 of the auxiliary motor carries three cams $C_1$, $C_2$ and $C_3$ which respectively actuate contacts $c_1$, $c_2$, $c_3$ upon rotation of the motor 6.

On the other hand, a suitable measuring apparatus, for instance of the relay type, is arranged at the emitting station so that its movable unit drives, directly or through the medium of suitable devices, a member 1 which can come in contact with fixed contact pieces 2 and 3 according to its direction of displacement.

Between the contact pieces 2 and 3 and the windings 4 and 5 of the auxiliary motor 6 is arranged a switching system such that the motor 6 rotates according to a definite amplitude and in a definite direction as the member 1 comes in contact with one or the other of the contact pieces 2 and 3, whatever may be the duration of this contact. Besides, the switching device controls the emission of impulses of definite nature according as the member 1 comes in contact with one or the other of the contact pieces 2 and 3 and, consequently, as the auxiliary motor rotates in one direction or the other.

Another object of the invention is to prevent any further operation of the auxiliary motor arranged at the receiving station as long as the function in progress is not terminated.

Figure 2:
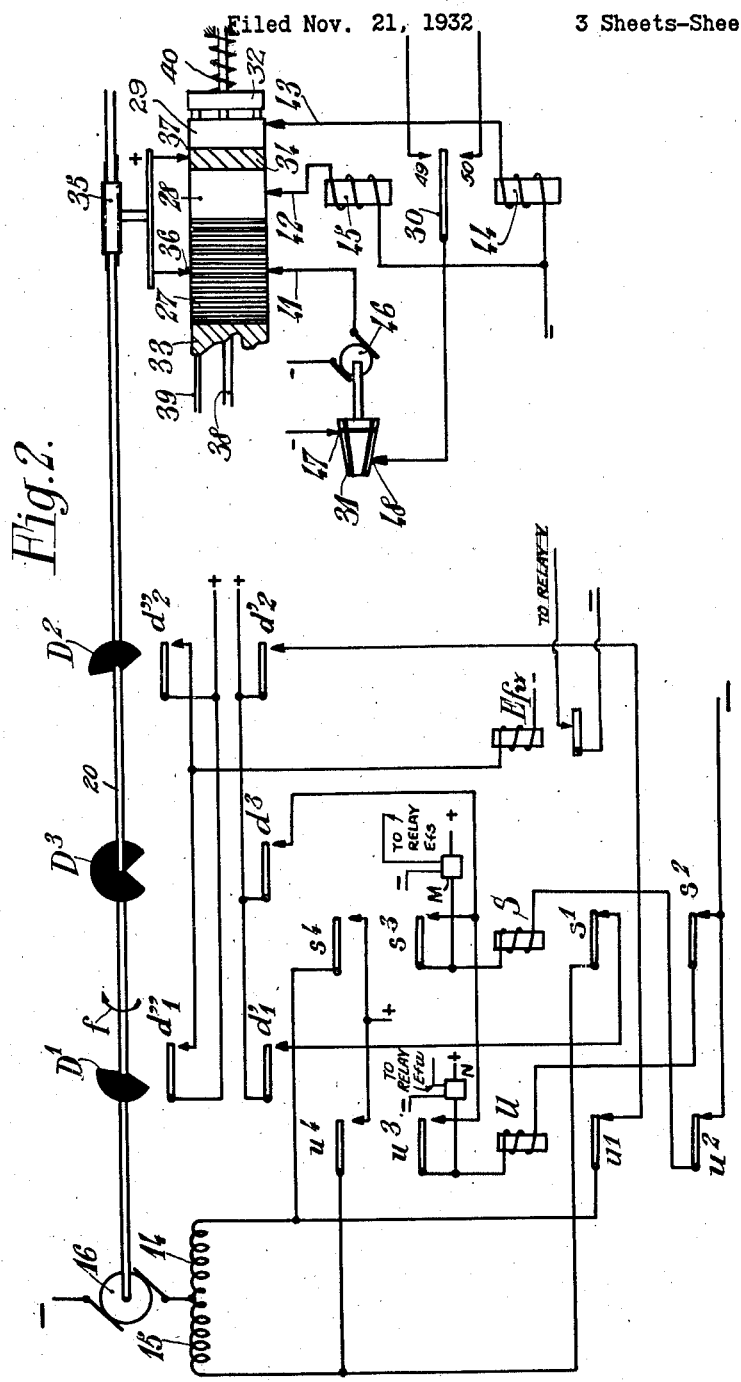
Fig. 2 is a diagrammatic view of a form of construction of a receiving station according to the invention.

The receiving station, diagrammatically illustrated in Fig. 2, comprises an auxiliary motor 16 having two windings 14 and 15 so arranged that the directions of rotation of the auxiliary motor are reverse to each other according as the current passes through one or the other of these windings. The current supply to these windings is controlled by switches actuated by the emissions of the emitting station, so that the rotation of the auxiliary motor arranged at the receiving station takes place in one direction or the other according to the impulse received, the nature of which depends, as above indicated, on the direction of rotation of the auxiliary motor arranged at the emitting station.

The shaft 20 of the auxiliary motor 16 carries three cams $D_1$, $D_2$ and $D_3$ which respectively actuate contacts $d_1'$—$d_1''$, $d_3$ and $d_2'$—$d_2''$ upon rotation of the motor. These contacts, in combination with the switching system indicated above, allow the motor to rotate according to a definite and constant amplitude.

Another object of the invention is to prevent any further operation of the auxiliary motors arranged at the emitting and receiving stations as long as the operation in progress is not completely terminated.

The operation of the emitting and receiving stations will now be described in greater detail.

Assuming the measuring apparatus arranged at the emitting station is so actuated as to move the member 1 in contact with the contact piece 2, a supply circuit, for the winding 4 of the auxiliary motor 6 is closed through: positive pole of the source of supply, contacts $v_1$ $b_1$ and $a_1$ at rest, member 1 in engagement with the contact piece 2, contact $r_1$ at rest, winding of relay T, winding 4 and armature of the auxiliary motor 6 and negative pole of the source of supply. The motor 6 is caused to rotate in the direction of the arrow $f$, and the cams $C_2$ and $C_3$ close the contacts $c_2$ and $c_3$. Another circuit feeding the winding 4 of the auxiliary motor 6 is closed through: positive pole of the source of supply, working contact $c_3$, working contact $t_3$, contact $r_1$ at rest, winding of the relay T, winding 4 and armature of the auxiliary motor 6, and negative pole of the source of supply. It will therefore be seen that even if contact between the member 1 and contact piece 2 is broken, the motor continues to rotate as long as the contact $c_3$ is held in closed position by the cam $C_3$.

Closing of the contact $c_2$ by the cam $C_2$ closes a circuit feeding the winding of relay B, through: positive pole of the source of supply, working contact $c_2$, resting contact $r_4$, winding of the relay B, and negative pole of the source of supply.

The relays B and T are then energized and the working contacts $t_1$, $t_2$, $t_4$ and $b_1$ are opened.

It will be seen that the various circuits feeding the windings of relays A and R cannot be closed and that, consequently, the winding 5 of the auxiliary motor 6 cannot be supplied with current.

The energization of relays T and B closes a circuit for the winding of relay E$fs$, through: positive pole of the source of supply, resting contact $v_2$, working contacts $b_3$ and $t_5$, winding of E$fs$ and negative pole of the source of supply.

The relay E$fs$ energizes and sends an impulse, through any suitable means, to the receiving station by wire, without wire or by directional waves, this impulse having given characteristics.

The relay E$fs$ by energizing closes a holding circuit for itself through: positive pole of the source of supply, resting contact $v_2$, working contact $efs$, working contact $t_5$, winding of E$fs$, and negative pole of the source of supply, so that, when the relay B is no longer energized, E$fs$ remains energized and continues to send impulses until the contact $v_2$ opens, as will be indicated later on when describing the operation of the receiving station.

The auxiliary motor 6 continuing to rotate, the cam $C_2$ releases the contact $c_2$ which opens and breaks the circuit supplying the relay B which de-energizes without causing any perturbation in the operation of the device. The cam $C_3$ releases, after a rotation of definite amplitude (one revolution in the case under consideration), the contact $c_3$ which opens, thus breaking the circuit feeding the auxiliary motor 6 and the entire device placed at the emitting station comes back to its position of rest owing to the de-energization of relay T.

Assuming that the motor 6 continues to rotate, by inertia for instance, thus causing closing of the contacts $c_3$ and $c_1$ by the cams $C_3$ and $C_1$, it will be seen that a circuit for feeding the winding of the relay A is closed through: positive pole of the source of supply, working contact $c_1$, resting contact $t_4$, winding of A, and negative pole of the source of supply. The relay A energizes and closes a circuit for feeding the winding 5 of the auxiliary motor 6, through: positive pole of the source of supply, resistance 7, resting contacts $r_2$ and $t_2$; working contact $a_2$; winding 5 and armature of the auxiliary motor 6, and negative pole of the source of supply. The resistance 7 is chosen so as to be equal to that of each of the windings of the relays T and R.

The motor 6 is driven in a direction reverse to that of the arrow $f$, and the cams $C_3$ and $C_1$ release the contacts $c_3$ and $c_1$ which open. The opening of $c_1$ opens the circuit feeding the motor, which stops in its position of rest. Assuming that it passes beyond this position, it will be seen that the cam $C_2$ would close the contact $c_2$, the relay B would be energized, closing a circuit for feeding the winding 4 of the auxiliary motor 6 which would tend, by a rotation in the direction of the arrow $f$, to come back to its position of rest.

It will also be noted that, the apparatus being at rest, if the auxiliary motor 6 is caused to rotate by hand in one direction or the other, it will be automatically restored to its position of rest. The cams $C_2$ and $C_1$ are identical, and a closing angle, which for the moment appears to be advantageous, is equal to about 45°.

The cams $C_1$, $C_2$ and $C_3$ are rigidly secured on the shaft 9 of the motor, so that the points of engagement of the cams $C_1$ and $C_3$ should be the same, as well as those of the cams $C_2$ and $C_3$, according as the motor rotates in one direction or the other.

The operation at the receiving station will now be described when emissions have taken place, and it will be assumed that these emissions arise from the energization of the relay E$fs$ placed at the emitting station. These emissions, collected by any suitable means M, energize the relay S, through: positive pole of the source of supply, M, winding of S, resting contact $U_2$, and negative pole of the source of supply. S energizes and closes a circuit for feeding the winding 14 of the auxiliary motor 16, through: positive pole of the battery, working contact $s_4$, winding 14 and armature of the auxiliary motor 16, and negative pole of the battery.

The motor 16 is caused to rotate in the direction of the arrow $f$, and the cams $D_2$ and $D_3$ close the contacts $d_2'$, $d_3$ and $d_2''$. The closing of the contact $d_2''$ closes a circuit for feeding the emitting device E$fv$ which sends impulses the function of which will be explained later on. The closing of the contact $d_3$ closes another circuit for feeding the winding of the relay S through: positive pole of the source of supply, working contact $d_3$, working contact $s_3$, winding of S, resting contact $u_2$, and negative pole of the source of supply, so that, even if the impulses cease, the relay S continues to be energized during the entire definite amplitude of the rotation of the motor corresponding to the angle of the cam $D_3$.

When the cam $D_3$ releases the contact $d_3$, the latter, by opening, breaks the circuit feeding the winding of relay S, which de-energizes and opens at $s_4$ the circuit feeding the winding 14 of the auxiliary motor 16. The latter stops and the entire apparatus comes to rest.

Assuming that the rotation of the motor in the direction of the arrow $f$ continues, by inertia for instance, until it causes the cams $D_1$ and $D_3$ to close the contacts $d_1'$, $d_3$ and $d_1''$, it will be seen that a circuit for feeding the winding 15 of the motor 16 is closed through: positive pole of the source of supply, working contact $d_1'$ resting contact $s_1$, winding 15 and armature of the auxiliary motor 16, and negative pole of the battery. The motor 16 will rotate in reverse direction to the arrow $f$, and the cam $D_1$ releasing the contact $d_1'$, the latter will open and will break the supply circuit of the motor 16, which will stop in the position of rest.

It will moreover be seen that, if the motor 16 is caused to rotate by hand for instance according to an amplitude sufficient for causing one of the cams $D_1$ or $D_2$ to close its corresponding contact $d_1'$ or $d_2'$, the motor will be automatically restored to its position of rest.

Besides, every time the motor rotates according to an amplitude sufficient for causing one of the cams $D_1$ or $D_2$ to close its corresponding contacts $d_1'$, $d_1''$, or $d_2'$, $d_2''$, it will be seen that the circuit of the emitting device E$fv$ closes and sends an impulse to the emitting station.

The emissions sent by the device E$fv$ are received at the emitting station and actuate, by any suitable means, the relay V which energizes and opens the contacts $v_1$ and $v_2$. The opening of these contacts prevents any further actuation of the device in case the auxiliary motor 6 has come back to its position of rest, the initial circuits feeding the motor 6 through the medium of the member 1 being opened at $v_1$ and also prevents any emission by the devices E/s and E/u, the circuit of each of them being opened at $v_2$.

Besides, the energization of relay V causes the closing of a contact $v_3$ which closes a circuit for feeding a member 8 controlling the operation of the receiving station (valve for instance).

In order that the emitting device E/v placed at the emitting station should be fed during the entire operation of the motor, the cams $D_1$ and $D_2$ have such a profile that at least one of the contacts $d_1''$ and $d_2''$ should always be closed whilst the contact $d_3$ is at work. Without departing from the scope of the present invention, the contacts $d_1''$ and $d_2''$ might be replaced by a single contact which would be actuated by the cam $D_3$ at the same time as the contact $d_3$, that is to say during all the time the motor of the receiving station is actuated.

It will also be noted that, in the foregoing, the operation of the emitting station and that of the receiving station have been described only in case the member 1 has come in engagement with the contact piece 2, this having caused an emission by the device E/s; it is obvious that the operation takes place in the same way in case the member 1 comes in engagement with the contact piece 3.

Fig. 3 shows a diagram of a modification of the emitting station, particularly relating to the relays R and T. Each of these relays has two windings $R_1$, $R_2$ and $T_1$, $T_2$, in such a manner that if only one of these windings is supplied with current, the relay does not operate. The operation can take place only if both windings of one and the same relay are simultaneously supplied with current, one winding $R_1$ or $T_1$, being in series with the circuit comprising the movable member 1, the other winding, $R_2$ or $T_2$ being in series with the circuit comprising in series the contact $c_3$.

Assuming for instance that 1 should come in engagement with the contact piece 2, it will be seen that the winding $T_1$ is supplied with current by the following circuit: positive pole of battery, resting contact $v_1$, resting contacts $a_1$ and $b_1$, member 1 in engagement with the contact piece 2, resting contact $r_1$, winding $T_1$ winding 4 and armature of the auxiliary motor 6, and negative pole of the battery. The motor 6 rotates and the cam $C_3$ closes the contact $c_3$ which in its turn closes the following circuit for the winding $T_2$: positive pole of the battery, resting contact $r_6$, winding $T_2$, and negative pole of the battery. The windings $T_1$ and $T_2$ are then both energized and the relay can operate. The remaining part of the operation is the same as in the case of Fig. 1. A similar operation takes place for the windings $R_1$ and $R_2$ when the member 1 comes in engagement with the contact piece 3.

The resistance 7 is then so chosen as to be equal to that of each of the windings $R_1$ and $T_1$.

At the receiving station, or at the emitting station, or at both simultaneously, the shaft carrying the cams might also be controlled through the medium of suitable speed reducing devices respectively driven by the auxiliary motors 16 and 6, instead of rigidly securing them on the shafts of these auxiliary motors. Likewise, the definite amplitude of rotation of the shafts carrying the cams might be equal to a fraction of a revolution.

The auxiliary motor 16, placed at the receiving station, controls moreover, either directly, or through the medium of electric contacts arranged in the circuit of an auxiliary motor or any other devices, the apparatus, the remote automatic operation of which is to be effected. Thus, the emitting station previously described being located for instance at the point of utilization of the electric energy produced by a generating plant placed at the receiving station, if the control apparatus actuating the member 1 is a wattmeter, the auxiliary motor acting on the governor of the turbine of the turbo-alternator producing energy is controlled by means of the auxiliary motor 16 placed at the receiving station, therefore at the generating plant. In this way, the quantity of energy produced will be constantly limited to the requirements.

For that purpose, the auxiliary motor 16 controls, through a worm and worm wheel device 35, the longitudinal displacement of two wipers 36 and 37 bearing on the periphery of drums. These drums 27, 28 and 29 are angularly and rigidly secured on a shaft 38, but can be longitudinally moved on this shaft 38, either by hand, or by means of any suitable devices; or by a cam 33 angularly and axially rigid with the shaft 38 and constantly bearing against a fixed abutment 39 under the action of a spring 40. This series of drums is caused to rotate by means of a train of wheels 32. The drums 27, 28 and 29 are electrically insulated from each other; besides, the conducting drums 28 and 29 are separated by an insulating drum 34 of a predetermined height, as will be explained hereinafter. The wipers 41, 42 and 43 respectively bear on each of the drums 27, 28 and 29. The wipers 42 and 43 are connected to the coils 44 and 45 controlling a current reverser 30, the wiper 41 is connected to the terminals of the variable speed motor 46 actuating an impulse emitter 31 on which bear two wipers 47 and 48, one of which is connected to one of the poles of a source of supply, and the other to the movable member of the current reverser.

The auxiliary motor 16 causes the worm of the worm and nut device to rotate; the contacts 36 and 37 are moved in one direction or the other according to the direction of rotation of the worm. It will be assumed that the wipers are moved towards the right according to a sufficient extent (corresponding to a certain number of impulses) for causing the wiper 37 to come in contact with the drum 29. The width of the insulating drum is so chosen that the number of impulses necessary for moving the wiper 37 in contact with one of the drums 28 or 29, should correspond to a certain variation of the load below which it is not desired to act on the regulating devices of the turbo-alternators. The wiper 37 having come in contact with the drum 29, a circuit closes for the winding 44 of the current reverser 30, through wiper 37, drum 29, wiper 43, winding 44, earth. The current reverser 30 establishes the contact with one of the contact pieces 49 or 50 arranged in the circuit controlling the auxiliary motor serving to regulate the turbines. The wiper 36 has also moved towards the right and the resistance of the drum 27 comprised between the wipers 36 and 41 has increased thus causing the motor 46 to slow down, and the impulse emitter 31 sends impulses of a certain duration. If the wiper 36 further moves towards the right, the resistance increases, the speed of the motor 36 diminishes and the duration of the impulses increases, this causing a more extended action of the regulating auxiliary motor.

The drum 27 can be constructed in various manners for the purpose of inserting a resistance in the circuit during the displacements of the wiper 36. Thus, for instance, a resistant wire is wound on the periphery of the drum, in the known manner, or the periphery of the drum is constituted by a thin and very resistant, blade on which the wipers bear, or again the drum is constituted by axial superposition of alternately insulating and conducting discs, the conducting discs being connected in series, with interposition of a resistance between any two adjacent discs.

The longitudinal and angular displacement of the entire set of drums 27, 28 and 29, as well as the transverse displacement of the wipers 41, 42 and 43, are adapted to compensate the variations of load which are known beforehand, at least approximately. For that purpose, the profile of the cam 33 is established according to the mean diagram of the loads at the emitting station at every moment of the day, and the automatic regulation is effected from values of this diagram which are increased or diminished according to an arbitrary value function of the height given to the insulating drum 34. The drum can also be moved in translation by hand by means of any suitable devices, these means being used separately or in combination with the automatic means indicated above.

It will easily be seen that the present invention is applicable in case there are provided either several emitting stations, or several receiving stations, or several emitting and receiving stations operating simultaneously, the receiving station or stations being then responsive to the emission of the stations arranged at the places of distribution.

Likewise, the regulating device can act for regulating any other characteristics of the current, for instance its frequency; in this case, the control member placed at the emitting station is controlled by a frequence-meter instead of a wattmeter, and the receiving apparatus placed at the receiving station are such that they act for modifying the frequency of the current produced.

What I claim as my invention and desire to secure by Letters Patent is:

1. In a remote control device, a transmitter comprising a two-pole contactor, a first rotary switch arranged for successively closing two circuits during its rotation, means for causing the said first switch to rotate in one direction or the other when the contactor comes in engagement with one or the other of these poles, means for opening one or the other of the two circuits controlled by the said first switch according to the direction of rotation of the latter, means for emitting impulses controlled by the said first rotary switch, a receiver comprising means for receiving the emissions of the emitting station, a second rotary switch actuated, from the said receiving means, in one direction or the other according to the nature of the emissions received and arranged for closing two circuits during its rotation, means for opening one or the other of the two circuits controlled by the said second rotary switch according to the direction of rotation of the latter, means for emitting impulses controlled by the said second rotary switch, adapted to lock the said emitting station during the entire rotation of the said second rotary switch, and means controlled by the said second rotary switch for controlling any desired apparatus placed at the receiving station.

2. In a remote control device, a transmitter comprising a two-pole contactor controlled by a measuring apparatus, a first rotary switch driven by an auxiliary motor having two field windings, means for causing the said motor to rotate in one direction or the other by supplying one or the other of its windings with current when the contactor comes in contact with one or the other of its poles, means for opening one or the other of the two circuits controlled by the said first rotary switch according to the direction of rotation of the latter, means for emitting impulses controlled by the said first rotary switch, a receiver comprising means for receiving the emissions of the emitting station, a second rotary switch actuated, from the said receiving means, in one direction or the other according to the nature of the emissions received and arranged for closing two circuits during its rotation, means for opening one or the other of the two circuits controlled by the said second rotary switch according to the direction of rotation of the latter, means for emitting impulses controlled by the said second rotary switch, adapted to lock the said emitting station during the entire rotation of the said second rotary switch, and means controlled by the said second rotary switch for controlling any desired apparatus placed at the receiving station.

3. In a remote control device, a transmitter comprising a two-pole contactor, a first rotary switch, an auxiliary motor for actuating the said first switch, cams mounted on the shaft of the said auxiliary motor for controlling contacts placed on circuits supplying with current the windings of the said auxiliary motor in order to cause the latter to rotate in the same direction as that in which the said motor has previously been driven and to prevent any rotation in reverse direction as long as the rotation begun has not reached the predetermined amplitude, two emitting circuits, contacts actuated by the said cams for closing one or the other of the said emitting circuits, a receiver comprising means for receiving the emissions of the emitting station, a second rotary switch actuated, from the said receiving means, in one direction or the other according to the nature of the emissions received and arranged for closing two circuits during its rotation, means for opening one or the other of the two circuits controlled by the said second rotary switch according to the direction of rotation of the latter, means for emitting impulses controlled by the said second rotary switch, adapted to lock the said emitting station during the entire rotation of the said second rotary switch, and means controlled by the said second rotary switch for controlling any desired apparatus placed at the receiving station.

4. In a remote control device, a transmitter comprising a two-pole contactor, a first rotary switch, an auxiliary motor for actuating the said first switch, cams mounted on the shaft of the said auxiliary motor for controlling contacts placed on circuits supplying with current the windings of the said auxiliary motor in order to cause the latter to rotate in the same direction as that in which the said motor has previously been driven and to prevent any rotation in reverse direction as long as the rotation begun has not reached the predetermined amplitude, two emitting circuits, contacts actuated by the said cams for closing one or the other of the emitting circuits, a receiver comprising means for receiving the emissions of the emitting station, a second rotary switch driven by an auxiliary motor having two field windings, means for causing the said motor to rotate in one direction or the other according to the nature of the emissions received, means for opening one or the other of the two circuits controlled by the said second rotary switch according to the direction of rotation of the latter, means for emitting impulses controlled by the said second rotary switch, adapted to lock the said emitting station during the entire rotation of the said second rotary switch, and means controlled by the said second rotary switch for controlling any desired apparatus placed at the receiving station.

5. In a remote control device, a transmitter comprising a two-pole contactor, a first rotary switch, an auxiliary motor for actuating the said first switch, cams mounted on the shaft of the said auxiliary motor for controlling contacts placed on circuits supplying with current the windings of the said auxiliary motor in order to cause the latter to rotate in the same direction as that in which the said motor has previously been driven and to prevent any rotation in reverse direction as long as the rotation begun has not reached the predetermined amplitude, two emitting circuits, contacts actuated by the said cams for closing one or the other of the emitting circuits, a receiver comprising means for receiving the emissions of the emitting station, a second rotary switch driven by an auxiliary motor having two field windings, cams fast on the shaft of the said auxiliary motor for controlling contacts placed on circuits supplying the said auxiliary motor with current in order to cause the latter to rotate in the same direction as that in which the said motor has previously been driven and to prevent any rotation in reverse direction as long as the rotation begun does not reach the predetermined amplitude, means for emitting impulses controlled by the said second rotary switch, adapted to lock the said emitting station during the entire rotation of the said second rotary switch, and means controlled by the said second rotary switch for controlling any desired apparatus placed at the receiving station.

6. In a remote control device, a transmitter comprising a two-pole contactor, a first rotary switch, an auxiliary motor for actuating the said first switch, cams mounted on the shaft of the said auxiliary motor for controlling contacts placed on circuits supplying with current the windings of the said auxiliary motor in order to cause the latter to rotate in the same direction as that in which the said motor has previously been driven and to prevent any rotation in reverse direction as long as the rotation begun has not reached the predetermined amplitude, two emitting circuits, contacts actuated by the said cams for closing one or the other of the emitting circuits, a receiver comprising means for receiving the emissions of the emitting station, a second rotary switch driven by an auxiliary motor having two field windings, cams fast on the shaft of the said auxiliary motor for controlling contacts placed on circuits supplying the said auxiliary motor with current in order to cause the latter to rotate in the same direction as that in which the said motor has previously been driven and to prevent any rotation in reverse direction as long as the rotation begun does not reach the predetermined amplitude, contacts actuated by the said cams, an impulse emitting circuit controlled by the said latter contacts for determining the locking of the said emitting station and preventing any operation of the latter as long as the movement in progress is not terminated, and means controlled by the said auxiliary motor for controlling any desired apparatus placed at the receiving station.

LÉON ADOLPHE BERNARD RONDOT.